April 14, 1931. L. GERVAIS 1,800,789
COMBINED TRANSFER CAR AND LUMBER WEIGHING APPARATUS
Filed June 20, 1929 2 Sheets-Sheet 1
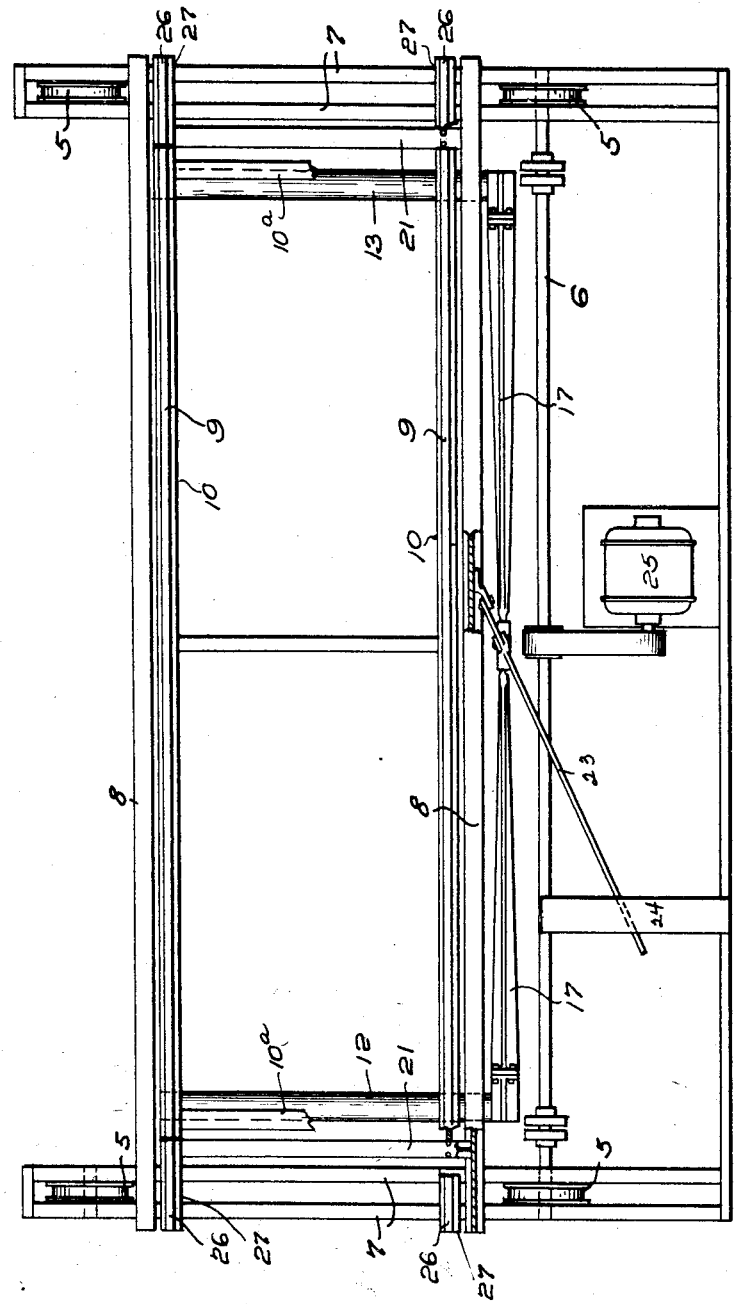
INVENTOR.
LOUIS GERVAIS,
BY
ATTORNEYS

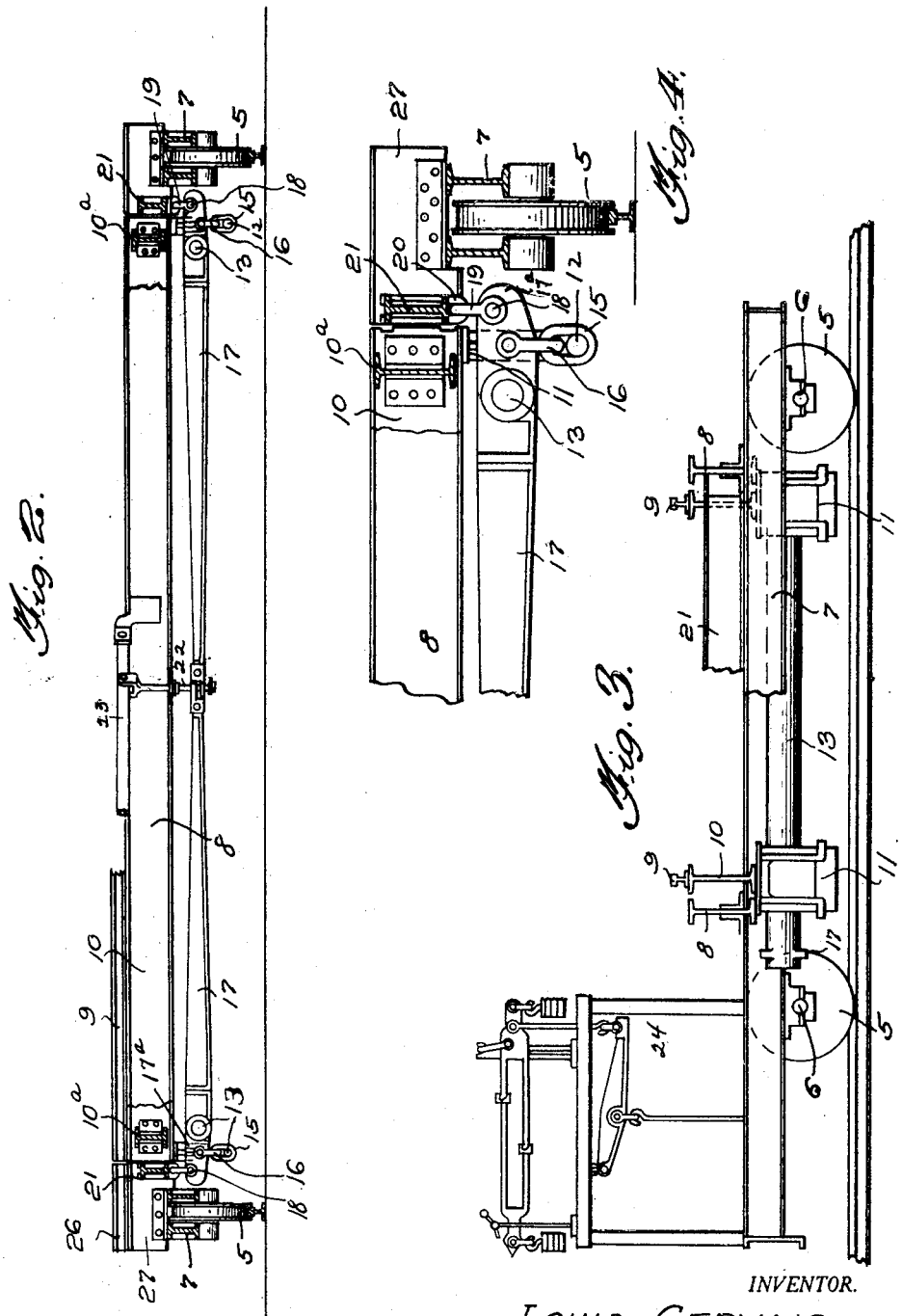

Patented Apr. 14, 1931

1,800,789

UNITED STATES PATENT OFFICE

LOUIS GERVAIS, OF BURNS, OREGON

COMBINED TRANSFER CAR AND LUMBER-WEIGHING APPARATUS

Application filed June 20, 1929. Serial No. 372,334.

This invention relates to a combined transfer car and lumber weighing apparatus, and it has for its object to combine a weighing scale with a transfer car in such manner that the weighing apparatus will be adapted to bodily receive trucks having cribs of lumber piled thereon, and to weigh said lumber while it is in place upon the transfer car, to determine the moisture content of said lumber.

As is well known, lumber is dried in kiln chambers, either with all of the loads in the kiln loaded in at one time and dried at one time, or loaded in one or more cars at a time and dried with the lumber progressing through the kiln continuously.

In either case, lumber is brought to the kiln on transfer cars from the point at which it is loaded and later taken away from the kilns to the unloading place by a second transfer car, (in some cases the same transfer) after it is dry.

As can be readily seen, it will always be a desirable thing to gauge the effect of the drying process by knowing the weight of the lumber before, after, and even perhaps during the time of drying, weight being the best indication of the progress of the process. By knowing the relative weights before, after, or during the process, the methods used in seasoning lumber can be systematized and improved, and the accuracy of the final result can be made more nearly exact than when such records are not available.

By mounting a weighing scale on transfer cars used to convey the loads of lumber about the drying chambers, it is possible to secure this information in a very practical way. The weight of each load may be secured as the lumber loads are being transported to the kilns; a comparative weight may be secured for the same loads as they are being transported from the kilns and at any intermediate time, or loads may be temporarily withdrawn from the kilns and weighed on the transfer car to give intermediate weight data.

One embodiment of the invention is illustrated in the accompanying drawings, in which, Fig. 1 is a plan view, Fig. 2 is a side elevation, Fig. 3 is an end elevation of an apparatus constructed in accordance with the invention, and Fig. 4 is a detailed view of a scale link mechanism, hereinafter described.

Like numerals designate corresponding parts in all of the figures of the drawings.

In the drawings, 5 designates supporting track wheels which, with shafts 6, longitudinally extending frame members 7 and transverse frame members 8, make up a transfer car. In the transfer cars now commonly in use, track rails are carried by rigid transverse frame members 8, of such cars.

According to the present invention, I mount these track rails, indicated at 9, (and which are intended to receive the lumber trucks, upon which cribs of lumber are piled) upon movable I-beams 10, which, in conjunction with other elements, constitute what is, in effect, the movable platform of a weighing scale. These I-beams are tied together by cross-beams 10a and they rest upon chairs 11, said chairs having projections 12, supported in links 15. These links are, in turn, supported by clevises 16, from beams 17a. Said beams are, in turn, hung at 18 upon fulcrum links 19, that are supported by U-shaped members 20 from cross-beams 21, which extend between and are secured to the rigid frame members 8, and constitute a part of the frame of the transfer car. Beams 17a carry transverse tongue rods 13 and the latter carry scale levers 17 at one side of the movable scale platform. The levers 17 are connected at their confronting ends by rods 22, and conventional scale lever mechanism, indicated at 23, with a conventional type of weighing scale, indicated at 24. It is the usual practice to provide these transfer cars with self-propelling mechanism such, for example, as electric motors to which current is supplied by trolleys. An electric motor has been indicated at 25 merely for the purpose of indicating that the device is to be self-propelled. The particular drive mechanism forms no part of the present invention.

It is common practice to determine the extent to which the drying operation has been carried, by weighing portions of the lumber to determine moisture content at the time of weighing. The most usual method of determining whether the lumber is dry enough to be withdrawn from the kiln is to cut small pieces from a few boards in the kiln, and by weighing them, determine their dryness. This method has the following disadvantages:

*a.* It is very difficult to select a typical sample board with the result that the weight figures received do not represent the remainder of the lumber and cause the method to be inaccurate.

*b.* It is unhealthful, inconvenient, and sometimes impossible, for the operator to enter the kiln chamber for samples, due to the high atmosphere, temperature and humidity of the kiln.

A second very common method for determining the dryness of the lumber is by observing the appearance of the stock or by cutting slivers off various boards with a jack-knife. Lumber being a cellular non-homogeneous substance, does not take on marked characteristics as a whole, which can be observed by these methods, with the result that inaccurate operation results from this method, causing losses in material, operating expenses, and degrades which amount to a serious figure.

Various small devices have been used in kilns during the process of drying to establish the progress and effect, the most common being as follows:

*a.* A device which reports the weight of a single sample board back to an operating instrument outside the kiln, this weight becoming available to the operator as data, means being provided for automatically changing the temperature and humidity of the kiln on a pre-arranged schedule when its weight reaches various stages.

*b.* A device which consists of a scale mounted outside the kiln with a rod going to a small suspended platform carrying two or three boards. This scale is operated electrically by remote control and reports the weight electrically to the operator's headquarters.

*c.* Shrinkage devices to be set on one or more boards in a kiln which indicate the progress and conclusion of dryness by reduction in size from shrinkage.

All of these devices and methods involve the use of but a few samples, forming less than one percent of the total and are inaccurate because it is not practical to judge the condition of the whole by such a small percentage, in a material such as wood.

Under the present method, the above described difficulties are overcome because of the fact that all of the stock is weighed, and this constitutes a very real improvement in this art.

I am aware of the fact that it has been proposed to locate a weighing scale in the kiln, upon which the lumber continually rests, and which, through the weight of the whole load, operates mechanisms which control the kiln, but I am not aware that it has ever been proposed to locate a weighing scale, adapted to receive and weigh a whole truck load of lumber, upon a transfer car, so that the same weighing apparatus is rendered available for operation, with respect to any one of the series of kilns, whereby the duplication of weighing equipment for each separate kiln is rendered unnecessary.

The track rails 9, of the weighing scale structure, align with short track rail sections 26, which are, in turn, mounted upon short I-beam sections 27. These short I-beam sections are supported upon the longitudinally extending rigid frame members 7, of the transfer car, and it will, of course, be understood that, under the usual and conventional practice, this transfer car is moved from point to point, and to places where these short rail sections are brought into alignment with other track sections, upon which the lumber trucks are moved in leaving or passing on to the track rail sections 9.

It is to be understood that the particular embodiment of the invention herein shown and described, is illustrative only, since the invention may be embodied in many different forms without departure from the basic principle involved, which is, that of providing means for bodily weighing a whole load of lumber while it is in place upon a portable structure adapted to convey it from place to place. Therefore, it is to be understood that the invention is not limited to the precise construction set forth, but that it includes within its purview whatever changes fairly come within either the terms or the spirit of the appended claims.

Having described my invention, what I claim is:

1. A transfer car comprising a movable supporting element carrying track rails for the reception of loaded lumber trucks adapted to be delivered to or received from the track rails of a lumber drying kiln, a weighing scale mounted upon the transfer car, and connections between said weighing scale and said movable supporting element by which the weight of the lumber upon said trucks may be determined while the lumber is in place on the trucks, and the trucks are in place on the said tracks.

2. A structure as recited in claim 1, in combination with means for propelling the transfer car.

3. A structure as recited in claim 1, wherein the transfer car is provided with track wheels, and means for propelling the same.

4. A device of the character described, comprising a wheeled frame adapted to travel on a track way, and comprising short sections of track rail adjacent each end thereof, a vertically movable support, carrying sections of track rail adapted to align with the first named sections of track rail, a weighing scale comprising scale lever mechanism and connections between the scale lever mechanism and the vertically movable support whereby the weight of loaded lumber trucks upon the track rails of said support may be determined during the time that said trucks are in place thereon.

5. A transfer car comprising a movable weighing platform, a weighing scale associated with said platform and carried by the car for determining the weight of lumber on lumber trucks while said trucks are in place on the car, track wheels upon which the transfer car is mounted, tracks adapted to conduct the transfer car in one direction, and lumber truck receiving track rails upon the movable weighing platform, extended substantially at right angles to the track rails upon which the transfer car travels.

In testimony whereof I affix my signature.

LOUIS GERVAIS.